United States Patent
Karr et al.

(10) Patent No.: US 6,668,297 B1
(45) Date of Patent: Dec. 23, 2003

(54) POS-PHY INTERFACE FOR INTERCONNECTION OF PHYSICAL LAYER DEVICES AND LINK LAYER DEVICES

(75) Inventors: Travis J. Karr, Port Moody (CA); Winston Mok, Vancouver (CA); Richard A. J. Steadman, Vancouver (CA); Martin Chalifoux, Montreal (CA); Larrie S. Carr, Burnaby (CA)

(73) Assignee: PMC-Sierra, Inc. (CA)

( * ) Notice: Subject to any disclaimer, the term of this patent is extended or adjusted under 35 U.S.C. 154(b) by 0 days.

(21) Appl. No.: 09/459,972

(22) Filed: Dec. 14, 1999

(30) Foreign Application Priority Data

Mar. 17, 1999 (CA) .............................................. 2265346

(51) Int. Cl.[7] .............................................. G06F 13/00
(52) U.S. Cl. ...................................................... 710/305
(58) Field of Search ....................... 710/305; 709/250; 370/254, 395.5, 395.51, 465, 389

(56) References Cited

U.S. PATENT DOCUMENTS

| | | | | |
|---|---|---|---|---|
| 5,103,447 A | * | 4/1992 | Takiyasu et al. ............. | 370/460 |
| 5,113,369 A | * | 5/1992 | Kinoshita .................... | 710/307 |
| 5,122,691 A | * | 6/1992 | Balakrishnan .............. | 326/101 |
| 5,590,287 A | * | 12/1996 | Zeller et al. .................. | 703/26 |
| 5,608,882 A | * | 3/1997 | Abert et al. ................. | 710/307 |
| 5,758,089 A | | 5/1998 | Gentry et al. | |
| 5,892,924 A | * | 4/1999 | Lyon et al. .................. | 370/405 |
| 5,999,528 A | * | 12/1999 | Chow et al. ................. | 370/365 |
| 6,041,043 A | * | 3/2000 | Denton et al. ............... | 370/254 |
| 6,075,788 A | * | 6/2000 | Vogel ..................... | 370/395.51 |
| 6,122,281 A | * | 9/2000 | Donovan et al. ............ | 370/401 |
| 6,122,717 A | * | 9/2000 | Chan et al. .................. | 711/170 |
| 6,266,748 B1 | * | 7/2001 | Bishop ........................ | 711/158 |
| 6,445,705 B1 | * | 9/2002 | Holden et al. ............... | 340/2.2 |
| 6,449,655 B1 | * | 9/2002 | Hann et al. .................. | 370/358 |

OTHER PUBLICATIONS

"Interfaces," web downloaded Sep. 28, 2002, pp. 1–16.*
"OIF Electrical Interfaces," web downloaded Sep. 28, 2002, pp. 1–8.*
Murakami et al. "RFC2175—MAPOS 16– Multiple Access Protocol over SONET/SDH with 16 Bit Addressing." Jun. 1997, pp. 1–5.*
The ATM Forum Technical Committee, Utopia Specification Level 1, Version 2.01, af–phy–0017.000, Mar. 21, 1994.
The ATM Forum Technical Committee, Utopia Specification Level 2, Version 1.0, af–phy–0039.000, Jun., 1995.
SCI–PHY Saturn Compatible Interface Specification For PHY Layer and ATM Layer Devices, Level 2, Issue 3: Nov., 1995.
POS–PHY Saturn Compatible Packet Over SONET Interface Specification For Physical Layer Devices, Level 2, Issue 4: Jun., 1998.
PMC–Sierra, Inc. Press Release: "PMC–Sierra Announces Next–Generation Packet and Cell Processor Device Supporting New Packet–Over–SONET/SDH Specification (POS–PHY Level 3) for System Interfaces up to 3.2 Gigabits Per Second", Dec. 15, 1998.

* cited by examiner

*Primary Examiner*—Xuan M. Thai
(74) *Attorney, Agent, or Firm*—Hall, Priddy, Myers & Vande Sande

(57) ABSTRACT

A POS-PHY interface for interfacing between SONET/SDH PHY devices and Link Layer devices, including a 32 bit and an 8-bit point-to-point bus interface having a double-word data format operative to accommodate variable size packets of packet data.

25 Claims, 8 Drawing Sheets

|  | Bit 31 | Bit 24 Bit 23 | Bit 16 Bit 15 | Bit 8 Bit 7 | Bit 0 |
|---|---|---|---|---|---|
| Dword 1 | Byte 1 | Byte 2 | Byte 3 | Byte 4 |
| Dword 2 | Byte 5 | Byte 6 | Byte 7 | Byte 8 |
| Dword 3 | Byte 9 | Byte 10 | Byte 11 | Byte 12 |
| Dword 4 | Byte 13 | Byte 14 | Byte 15 | Byte 16 |
| Dword 5 | Byte 17 | Byte 18 | Byte 19 | Byte 20 |
| Dword 6 | Byte 21 | Byte 22 | Byte 23 | Byte 24 |
| ⋮ | ⋮ | ⋮ | ⋮ | ⋮ |
| Dword 28 | Byte 109 | XX | XX | XX |

A 109 Byte Packet

FIG. 4

|  | Bit 7 | Bit 0 |
|---|---|---|
| Byte 1 | Byte 1 ||
| Byte 2 | Byte 2 ||
| Byte 3 | Byte 3 ||
| Byte 4 | Byte 4 ||
| Byte 5 | Byte 5 ||
| Byte 6 | Byte 6 ||
|  | ⋮ ||
| Byte 62 | Byte 62 ||

A 62 Byte Packet

FIG. 5

POS-PHY INTERFACE FOR INTERCONNECTION OF PHYSICAL LAYER DEVICES AND LINK LAYER DEVICES

FIELD

The present invention relates to an interface for interconnecting Physical Layer (PHY) devices to Link Layer devices with a Packet over SONET (POS) implementation for exchanging packets within a communication system.

BACKGROUND

The development of protocols for interfaces between PHY devices and Link Layer devices has resulted in a number of specifications such as ATM Forum Utopia Level 2 Specification, the SCI-PHY Level 2 Specification, the SATURN POS-PHY Level 2 Specification and the ATM Forum proposals for Utopia Level 3. Utopia Level 1, Utopia Level 2 and Utopia Level 3 (in its draft form) are used for ATM cell transfer, in either direction, between one or more PHY devices. Utopia Level 1 was designed for data transfer between one PHY device and an ATM Layer device (Link Layer Processing). Utopia Level 2 is an extension of Utopia Level 1 that supports multiple PHY devices. SCI-PHY is a proprietary interface of PMC-Sierra, Inc. similar to Utopia Level 2. Utopia Level 3 is an extension to Utopia Level 1 and 2 that supports point to point transfer at a maximum throughput of 3.2 Gbps.

The foregoing interfaces are based on the transfer of fixed-length packets (cells). The signals and data formats were not designed to handle variable length packets between the data-Link Layer device and the PHY device. Accordingly, there is a need for a standard PHY interface which would provide a versatile bus interface for exchanging variable length packets within a communication system and, at the same time, one which is simple in operation in order to allow forward migration to more elaborate PHY and Link Layer devices.

Accordingly, it is an object of the invention to provide an improved interface for the interconnection of PHY devices to Link Layer devices. It is a further object of the invention to implement a Packet over SONET (POS) technology that provides for the transfer of variable length packets between the data-Link Layer device and the PHY device. It is yet a further object of the invention to provide a standard POS-PHY interface that allows either an 8-bit bus or a 32 bit bus interface running at a maximum speed of 100 MHz.

SUMMARY OF THE INVENTION

The present interface, termed the POS-PHY Level 3 interface, is an interface that was developed to cover all application bit rates up to and including 3.2 Gbit/s. It defines the requirements for interoperable single-PHY (one PHY device connects to one Link Layer device) and multi-PHY (multi PHY devices connect to one Link Layer device) applications. It stresses simplicity of operation to allow forward migration to more elaborate PHY and Link Layer devices.

The ATM Forum Utopia Level 2 Specification, the SCI-PHY Level 2 Specification, the SATURN POS-PHY Level 2 Specification and ATM Forum proposals for Utopia Level 3 were used in developing this POS-PHY specification, with several adaptations to support variable packet sizes. However, the POS-PHY specification is not intended to be compatible with the above-mentioned specifications.

This specification defines, firstly, the physical implementation of the POS-PHY bus, secondly, the signaling protocol used to communicate data and, thirdly, the data structure used to store the data into holding FIFO's.

Going forward, references to "POS-PHY" shall be taken to indicate "POS-PHY Level 3" unless otherwise noted.

POS-PHY Interface Reference Definition

The POS-PHY interface defines the interface between SONET/SDH PHY devices and Link Layer devices, which can be used to implement several packet-based protocols like High Level Data Link Control (HDLC) and PPP.

POS-PHY Level 3 specifies the PHY-LINK interface. The Facility Interface (such as SONET OC-3) is defined by several National and International standards organizations including Bellcore and ITU.

Compatibility Options

The POS-PHY Level 3 specification does not attempt to be compatible to any existing standard. There is no existing equivalent standard. Specifically, POS-PHY does not intend to be compatible with similar ATM specifications like Utopia and SCI-PHY. Although this information is not critical to any implementation, the following bullets highlight the differences between the Utopia/SCI-PHY and POS-PHY interfaces.

Allowance for an 8-bit bus of a 32-bit bus interface running at a maximum speed of 100 MHz. The bus interface is point-to-point (one output driving only one input load).

Byte or double-word (4 bytes) data format that can accommodate variable size packets.

Modification to the RSOC/TSOC start of cell signals to identify the start of packets being transferred over the interface. Renamed the signals to RSOP/TSOP.

Addition of the REOP/TEOP end of packet signals which delineate the end of packets being transferred over the interface.

Addition of the RMOD[1:0]/TMOD[1:0] modulo signals which indicate if the last double-word of the packet transfer contains 1, 2, 3 or 4 valid bytes of data.

Addition of the RERR/TERR error signals which, during the end of the packet, indicate if the transferred packet must be discarded/aborted.

Deletion of the RCA signal. Receive interface of the PHY pushes packet data to the Layer device. Multi-port PHY devices are responsible for performing round-robin servicing of their ports. PHY address is inserted in-band with the packet data.

Transmit interface of the PHY device is selected using an in-band address that is provided on the same bus transferring the packet data.

Addition of the RSX/TSX start of transfer signals which identify when the in-band port address of the PHY is on the RDAT/TDAT bus.

Modification of the TCA cell available signals to form the TPA packet available signals. TPA logic values are defined based on the FIFO fill level (in terms of bytes). In multi-port PHY devices, PHY status indication can be provided either by a polling or a direct status indication scheme. Polled PHY address is provided by a separate address bus and has pipelined timing.

Interface FIFO fill level granularity is byte-based. For the transmit interface FIFO, the packet available status and start of transmission FIFO fill levels are programmable. For the receive interface, the maximum burst transfer size is programmable.

According to the invention there is provided a POS-PHY interface for interfacing between SONET/SDH PHY devices and Link Layer devices, including a 32 bit and an 8-bit point-to-point bus interface having a double-word data format operative to accommodate variable size packets of packet data.

The interface may include a start of cell signal generator operative to generate start of cell signals RSOC/TSOC to identify when an in-band port address of one of the PHY devices is on a bus of the interface.

The interface may have a packet boundary signal generator operative to generate signals REOP/TEOP which delineate the start and end of packets being transferred over the interface.

The interface may include a last double-word valid byte indicator operative to indicate if the last double-word of a packet transfer contains 1, 2, 3, or 4 valid bytes of data.

The interface may have an error signal generator operative to generate REFF/TERR signals at an end of a packet to indicate whether or not a transferred packet should be discarded/aborted.

At least one of the PHY devices may have a plurality of ports with a corresponding respective plurality of first-in first-out buffers (FIFOs) and the one PHY device services each port in a round-robin fashion.

Upon transferring packet data from the Link Layer device to one of a plurality of PHY devices, an address of the one PHY device may be inserted in-band with the packet data.

A transmit interface of one of the PHY devices may be selected using an in-band address provided on a same bus which transfers the packet data.

Transmit packet available signals may be defined based on a byte fill level of first-in first-out buffers of the PHY devices.

The status of packet data reception capacity may be provided using one of polling and direct status indication.

Polled PHY addresses may be provided by a separate address bus and includes pipelined timing.

Transfers of the data units may employ UTOPIA level 2 methods adapted for data transfers of non-constant length.

An in-band port address of a PHY device may be identified when it is on a data transfer bus. Also a start and end of a variable length data transfer may be delineated. The order of relevant bytes in an end of a data transfer may, advantageously, be determined.

In another aspect of the invention, there may be provided a method of interfacing between SONET/SDH PHY devices and Link Layer devices, which includes forming a 32 bit and an 8-bit point-to-point bus interface having a double-word data format operative to accommodate variable size packets of packet data.

The method may include generating start of cell signals RSOC/TSOC to identify when an in-band port address of one of the PHY devices is on a bus of the interface.

REOP/TEOP signals which delineate the start of and end of packets being transferred over the interface may be generated.

The method, preferably, indicates if the last double-word of a packet transfer contains 1, 2, 3, or 4 valid bytes of data. It also includes generating REFF/TERR signals at an end of a packet to indicate whether or not a transferred packet should be discarded/aborted.

At least one of the PHY devices may have a plurality of ports with a corresponding respective plurality of first-in first-out buffers (FIFOs) and the one PHY device services each port in a round-robin fashion. Upon transferring packet data from the Link Layer device to one of a plurality of PHY devices, an address of the one PHY device may be inserted in-band with the packet data.

A transmit interface of one of the PHY devices may be selected using an in-band address provided on a same bus which transfers the packet data.

Transmit packet available signals may be defined based on a byte fill level of first-in first-out buffers of the PHY devices.

The status of packet data reception capacity may be provided using one of polling and direct status indication.

Polled PHY addresses may be provided by a separate address bus and include pipelined timing.

BRIEF DESCRIPTION OF THE DRAWINGS

Further features and advantages will be apparent from the following detailed description, given by way of example, of a preferred embodiment taken in conjunction with the accompanying drawings, wherein:

FIG. 4 shows the data structure for the 32-bit interface;

FIG. 5 shows the 8-bit interface data structure;

DETAILED DESCRIPTION WITH REFERENCE TO THE DRAWINGS

Signal Naming Conventions

Figure 1:
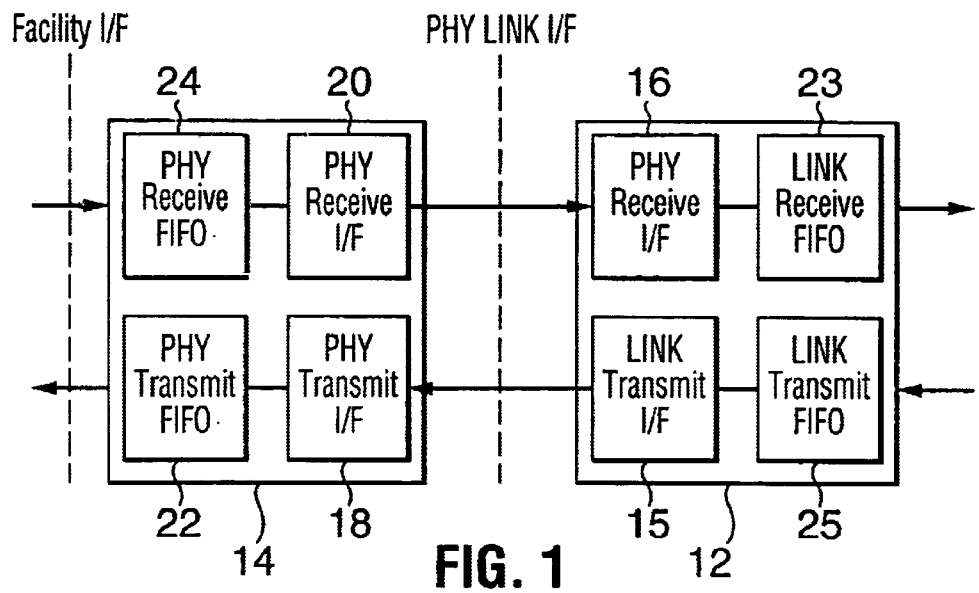
FIG. 1 is a block diagram of the location of the PHY-Link interface between a PHY device and a Link Layer device.

Referring to FIG. 1, the interface where data flows from the Link Layer device 12 to the PHY device 14 will be labeled the transmit interface 15. The interface where data flows from the PHY device to the Link Layer device 12 will be labeled the receive interface 16. All signals are active high unless denoted by a trailing "B".

SIGNAL Active high signaling.

SIGNAL B Active low signaling.

Bus Widths

POS-PHY compatible devices support an 8-bit and/or a 32-bit data bus structure. The bus interface is point-to-point (one output driving only one input load) and thus a 32-bit data bus would support only one device. To support multiple lower rate devices with point-to-point connections, an 8-bit data bus structure is defined. Thus, each PHY device would use an 8-bit interface reducing the total number of pins required.

To support variable length packets, the RMOD[1:0]/TMOD[1:0] signals are defined to specify valid bytes in the 32-bit data bus structure. Each double-word must contain four valid bytes of packet data until the last double-word of the packet transfer which is marked with the end of packet REOP/TEOP signal. This last double-word of the transfer will contain up to four valid bytes specified by the RMOD [1:0]/TMOD[1:0] signals.

Packet Interface Synchronization

The POS-PHY packet interface supports transmit and receive data transfers at clock rates independent of the line bit rate. As a result, PHY devices must support packet rate decoupling using FIFOs.

Figure 2:
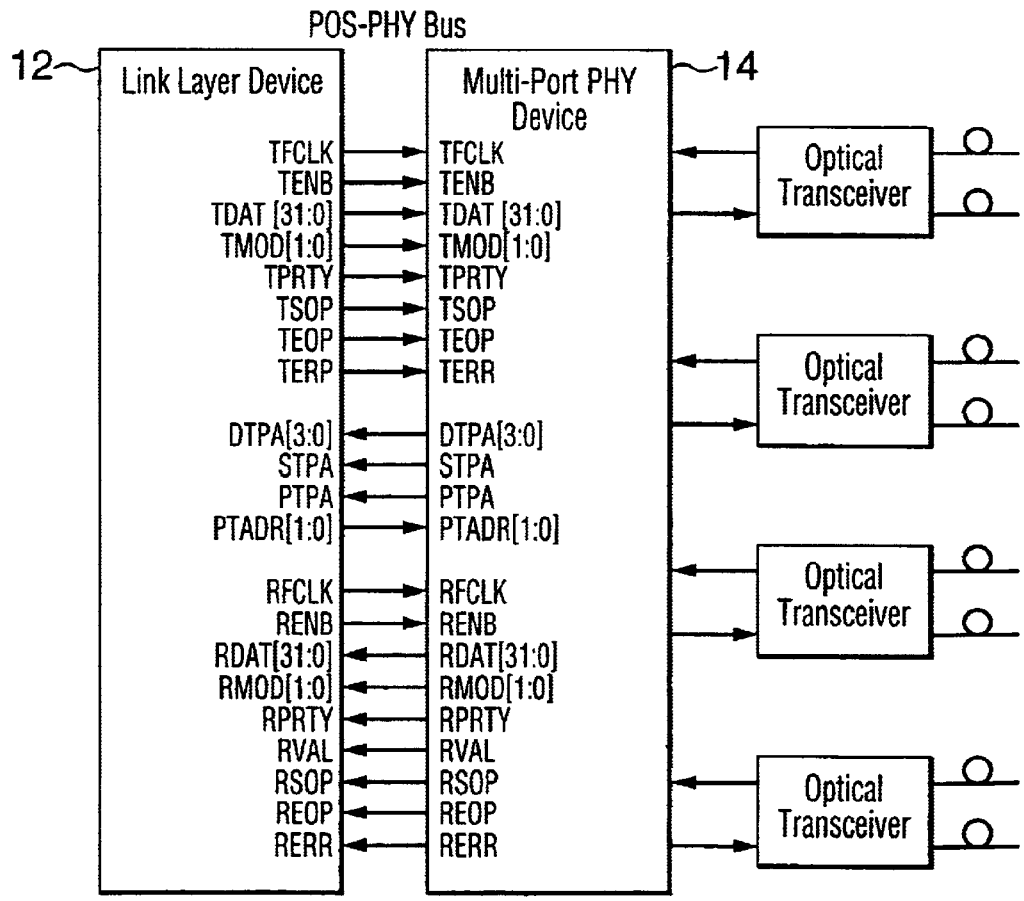
FIG. 2 is block diagram of a single multi-port PHY device interfaced to a Link Layer device.

To ease the interface between the Link Layer device 12 and PHY device 14 and to support multiple PHY interfaces as in FIG. 2, FIFOs (not shown) are used. Control signals are provided to both the Link Layer device 12 and PHY device 14 to allow either one to exercise flow control. Since the bus interface supports point-to-point transfer (one output driving only one input load), the PHY receive interface 24 of the PHY device 14 pushes data to the Link Layer device 12. For the transmit interface 18 the packet available status granularity is byte-based.

In the receive direction, when the PHY device 14 has stored an end-of-packet (a complete small packet or the end of a larger packet) or some predefined number of bytes in its receive FIFO 24, it sends the in-band address followed by FIFO data to the Link Layer device 12. The data on the interface bus is marked with the valid signal (RVAL) asserted. A multi-port PHY device (see FIG. 2) with multiple FIFOs (not shown) would service each port of the PHY device in a round-robin fashion when sufficient data is available in its FIFO. The Link Layer device 12 can pause the data flow by deasserting the enable signal (RENB).

In the transmit direction, when the PHY device 14 has space for some predefined number of bytes in its PHY transmit FIFO 22, it informs the Link Layer device 12 by asserting a transmit packet available (TPA). The Link Layer device 12 can then write the in-band address followed by packet data to the PHY device 14 using an enable signal (TENB). The Link Layer device 12 shall monitor TPA for a high-to-low transition, which would indicate that the transmit FIFO is near full (the number of bytes left in the FIFO can be user selectable, but must be predefined), and suspend data transfer to avoid an overflow. The Link Layer device 12 can pause the data flow by deasserting the enable signal (TENB).

POS-PHY defines both byte-level and packet-level transfer control in the transmit direction. When using byte level transfer, direct status indication must be used. In this case, the PHY device 14 provides the transmit packet available status of the selected port (STPA) in the PHY device. As well, the PHY device 14 may provide direct access to the transmit packet available status of all ports (DTPA[]) in the PHY device if the number of ports is small. With packet level transfer, the Link Layer device 12 is able to do status polling on the transmit direction. The Link Layer device 12 can use the transmit port address (TADR[]) to poll individual ports of the PHY device, which all respond on a common polled (PTPA) signal.

Since the variable size nature of packets does not allow any guarantee as to the number of bytes available, in both transmit and receive directions, a selected PHY transmit packet available is provided on signal STPA and a receive data valid on signal RVAL. STPA and RVAL always reflect the status of the selected PHY to or from which data is being transferred. RVAL indicates if valid data is available on the receive data bus and is defined such that data transfers can be aligned with packet boundaries.

PHY port selection is performed using in-band addressing. In the transmit direction, the PHY device selects a PHY port by sending the address on the TDAT[] bus marked with the TSOP signal active. All subsequent TDAT[] bus operations marked with the TSOP signal inactive and the TENB active will be packet data for the specified port. In the receive direction, the PHY device will specify the selected port by sending the address on the RDAT[] bus marked with the RSOP signal active and RVAL signal inactive. All subsequent RDAT[] bus operations marked with RSOP inactive and RVAL active will be packet data from the specified port.

Both byte-level and packet-level modes are specified in this standard in order to support the current low-density multi-port PHY devices and future higher density multi-port devices. When the number of ports in the PHY device is limited, byte-level transfer using DTPA[] signals provides a simpler implementation and reduces the need for addressing pins. In this case, direct access will start to become unreasonable as the number of ports increases. Packet-level transfer provides a lower pin count solution using the TADR[] bus when the number of ports is large. In-band addressing ensures the protocol remains consistent between the two approaches. However, the final choice is left to the system designers and PHY device and manufacturers.

Application Line Rates

The numerous combinations of clock rates and bus widths allow the Packet over SONET interface for PHY devices (POS-PHY) to support a wide range of line rates. Table 1 gives examples of line rates supported by POS-PHY interfaces and the maximum number of channels supported by the interface definitions.

TABLE 1

| | Interface Bit Rates | | |
|---|---|---|---|
| Standard Reference | Bit Rate (Mbit/s) | Number of PHYs (800 Mbit/s bus) | Number of PHYs (3.2 Gbit/s bus) |
| SONET STS-1 | 51.84 | 12 | 48 |
| SONET STS-3 SDH STM-1 | 155.52 | 4 | 16 |
| SONET STS-12 SDH STM-4 | 622.08 | 1 | 4 |
| SONET STS-48 SDH STM-16 | 2488.32 | N/A | 1 |

PHY and Link Layer Interface Example

Figure 3:
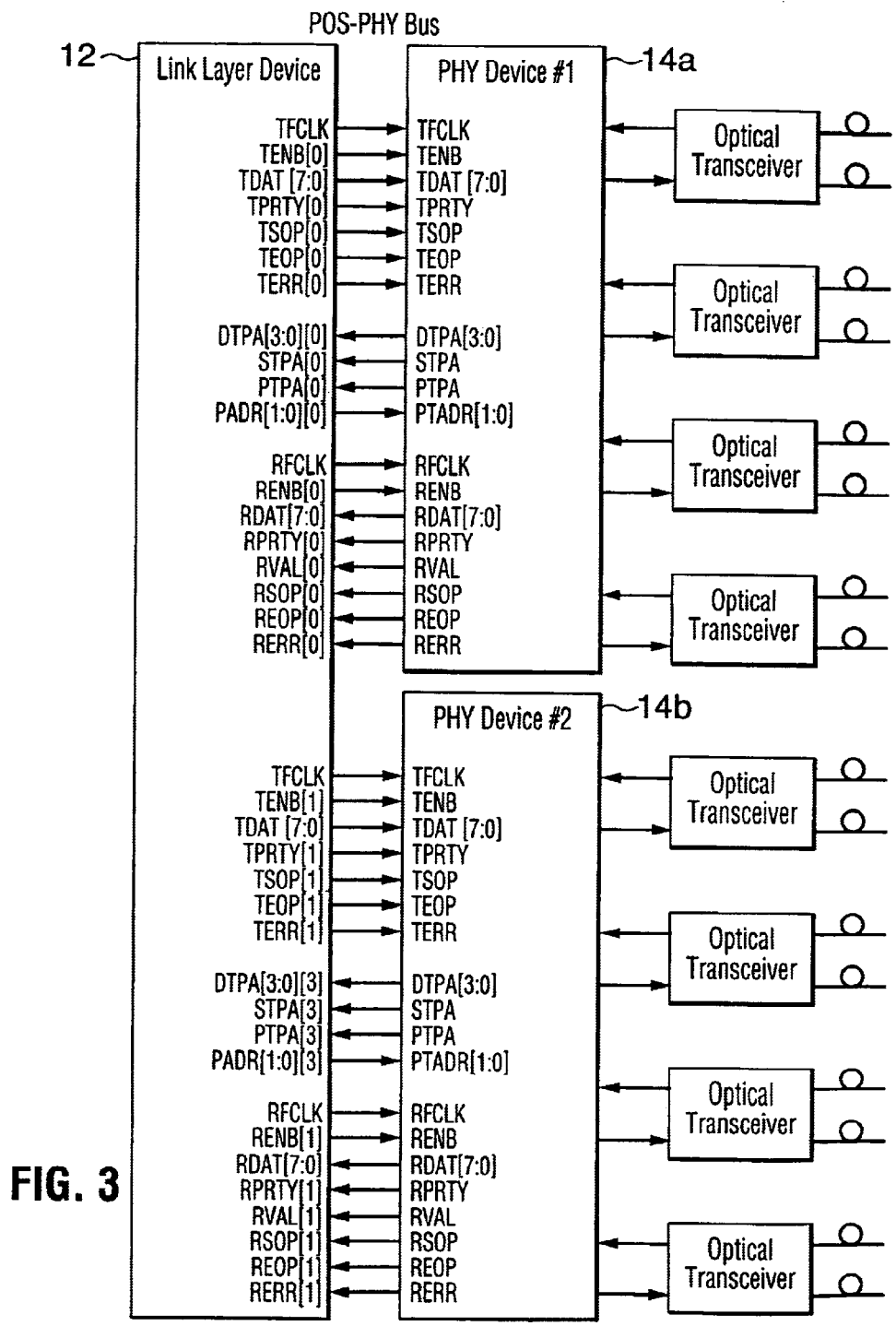
FIG. 3 is block diagram of two four-channel PHY devices interfaced to a Link Layer device using 8 bit interfaces.

FIG. 2 illustrates a conceptual example of how a single multi-port PHY device 14 may be interfaced to a Link Layer device 12. In the example, the Link Layer device 12 is connected to a single package, four-channel PHY device 14 using the 32-bit interface. FIG. 3 illustrates a conceptual example of how multi-port PHY devices 14 may be interfaced to a single Link Layer device 12. The Link Layer device 12 is connected to two four-channel PHY devices 14a and, 14b using 8-bit interfaces.

In both examples, the PHY devices 14a and 14b are using the direct status indication signals DTPA[]. Optionally, the Link Layer device 12 can perform multiplexed status polling using the PTPA signals.

Interface Data Structures

Packets shall be written into the transmit FIFO 22 read from the receive FIFO 24 using a defined data structure. Octets are written in the same order that they are to be transmitted or that they were received on the SONET line.

Within an octet, the MSB (bit 7) is the first bit to be transmitted. The POS-PHY specification does not preclude the transfer of 1-byte packets. In this case, both start of packet and end of packet signals shall be asserted simultaneously.

For packets longer than the PHY device FIFO 24, the packet must be transferred over the bus interface in sections. The number of bytes of packet data in each section may be fixed or variable depending on the application. In general, the receive interface 16 round-robins between receive FIFOs 23 with fill levels exceeding a programmable high water mark or with at least one end of packet being stored in the FIFO 23. The receive interface 16 would end the transfer of data when an end of a packet is transferred or when a programmable number of bytes have been transferred. The Link Layer device 12 may send fixed size sections of packets on the transmit interface 15 or use the TPA signal to determine when the FIFO reaches a full level.

FIG. 4 illustrates the data structure for the 32-bit bus interface. The double-word with the last byte of the packet is marked with TEOP asserted and TMOD[1:0] specifying the number of valid dates. FIG. 5 illustrates the data structure for the 8-bit bus interface. The first byte of the packet is market with TSOP asserted. The last byte of the packet is marked with TEOP asserted. In all cases, the PHY address is marked with TSOP asserted.

In both illustrations, the in-band port address for multiport PHY devices 14 is not shown. The transmit interface 18 would send the PHY port address, on the same bus as the data, marked with the TSOP signal active and the TENB signal inactive. Subsequent data transfers on the transmit interface 18 would use the transmit FIFO selected by the in-band address. On the receive interface 20, the PHY device 14 reports the receive FIFO address in-band with the RSOP signal active and the RVAL signal inactive before transferring packet data. For both cases, large packets which exceed the size of the FIFO 24 will be transferred over the POS-PHY interface in sections with appropriate in-band addressing prefixing each section.

The in-band address is specified in a single clock cycle operation marked with the TSOP/RSOP signals. The port address is specified by the TDAT[7:0]/RDAT[7:0] signals. The address is the numeric value of the TDAT[7:0]/RDAT [7:0] signals where bit 0 is the least significant bit and bit 7 is the most significant bit. Thus, up to 256 ports may be supported by a single interface. With a 32-bit interface, the upper 24 bits shall be ignored.

The POS-PHY specification does not define the usage of any packet data. In particular, POS-PHY does not define any field for error correction. Notice that if the Link Layer device 12 uses the PPP protocol, a frame check sequence (FCS) must be processed. If the PHY device 14 does not insert the FCS field before transmission, these bytes should be included at the end of the packet. If the PHY device 14 does not strip the FCS field in the receive direction, these bytes will be included at the end of the packet.

Transmit Packet Interface Description

The standard FIFO depth for POS-PHY interfaces is 256 octets. The transmit buffer should have a programmable threshold defined in terms of the number of bytes available in the FIFO for the assertion and deassertion of the transmit packet available flags.

In this fashion, transmit latency can be managed, and advance TPA look-ahead can be achieved. This will allow a Link Layer device 12 to continue to burst data in, without overflowing the transmit buffer, after TPA has been deasserted.

In the transmit direction, the PHY device 14 shall not initiate data transmission before a predefined number of bytes or an end of packet flag has been stored in the transmit FIFO 22. This capability does not affect the POS-PHY bus protocol, but is required to avoid transmit FIFO underflow and frequent data retransmission by the higher layers.

Transmit Signals

Table 2 lists the transmit side POS-PHY specification signals. All signals are expected to be updated and sampled using the rising edge of the transmit FIFO clock TFCLK. A fully compatible POS-PHY Physical Layer device requires at least a 256 byte deep FIFO.

TABLE 2

Transmit Signal Descriptions

| Signal Name | Direction | Function |
|---|---|---|
| TFCLK | LINK to PHY | Transmit FIFO Write Clock (TFCLK). TFCLK is used to synchronize data transfer transactions between the Link Layer device and the PHY device. TFCLK may cycle at a rate up to 100 MHz. |
| TERR | LINK to PHY | Transmit Error Indicator (TERR) signal. TERR is used to indicate that the current packet should be aborted. When TERR is set high, the current packet is aborted. TERR should only be asserted when TEOP is asserted. |
| TENB | LINK to PHY | Transmit Write Enable (TENB) signal. The TENB signal is used to control the flow of data to the transmit FIFOs. When TENB is high, the TDAT, TMOD, TSOP, TEOP and TERR signals are invalid and are ignored by the PHY. When TENB is low, the TDAT, TMOD, TSOP, TEOP and TERR signals are valid and are processed by the PHY |
| TDAT [31:0] | LINK to PHY | Transmit Packet Data Bus (TDAT[ ]) bus. The bus carries the packet octets that are written to the selected transmit FIFO and the in-band port address to select and desired transmit FIFO. The TDAT bus is considered valid only when TENB is simultaneously asserted. When a 32-bit interface is used, data must be transmitted in big endian order on TDAT[31:0]. Given the define data structure, bit 31 is transmitted first and bit 0 is transmitted last. When an 8-bit interface is used, the PHY supports only TDAT[7:0]. |
| TPRTY | LINK to PHY | Transmit bus parity (TPRTY) signal. The transmit parity (TPRTY) signal indicates the parity calculated over the TDAT bus. When an 8-bit interface is used, the PHY only supports TPRTY calculated over TDAT[7:0]. TPRTY is considered valid only when TENB is asserted. When TPRTY is supported, the PHY device is required to support both even and odd parity. The PHY device is required to report any parity error to higher layers, but shall not interfere with the transferred data. |
| TMOD [1:0] | LINK to PHY | Transmit Word Modulo (TMOD[1:0]) signal. TMOD[1:0] indicates the number of valid bytes of data in TDAT[31:0]. The TMOD bus should always be all zero, except during the last double-word transfer of a packet on TDAT[31:0]. When TEOP is asserted, the number of valid packet data bytes on TDAT[31:0] is specified by TMOD[1:0]. TMOD[1:0] = "00"   TDAT[31:0] valid TMOD[1:0] = "01"   TDAT[31:8] valid |

TABLE 2-continued

Transmit Signal Descriptions

| Signal Name | Direction | Function |
|---|---|---|
| | | TMOD[1:0] = "10"   TDAT[31:16] valid<br>TMOD[1:0] = "11"   TDAT[31:24] valid<br>When an 8-bit interface is used,<br>the TMOD[1:0] bus is not required. |
| TSOP | LINK to PHY | Transmit Start of Packet (TSOP) signal.<br>TSOP indicates when the in-band port address is present on the TDAT bus. When TSOP is high, the value of TDAT is the address of the transmit FIFO to be selected.<br>Subsequent data transfers on the TDAT bus will fill the FIFO specified by this in-band address. TSOP is considered valid only when TENB is asserted |
| TEOP | LINK to PHY | Transmit End of Packet (TEOP) signal.<br>TEOP is used to delineate the packet boundaries on the TDAT bus. When TEOP is high, the end of the packet is present on the TDAT bus.<br>When a 32-bit interface is used, TMOD[1:0] indicates the number of valid bytes the last double-word is composed of when TEOP is asserted. When an 8-bit interface is used, the last byte of the packet is on TDAT[7:0] when TEOP is asserted.<br>TEOP is required to be present at the end of every packet and is considered valid only when TENB is asserted. |
| TADR[ ] | LINK to PHY<br>Packet-Level Mode | Transmit PHY Address (TADR[ ]) bus.<br>The TADR bus is used with the PTPA signal to poll the transmit FIFOs packet available status.<br>When TADR is sampled on the rising edge of TFCLK by the PHY, the polled packet available indication PTPA signal is updated with the status of the port specified by the TADR address on the following rising edge of TFCLK. |
| DTPA[ ] | PHY to LINK<br>Byte-Level Mode | Direct Transmit Packet Available (DTPA[ ]).<br>The DTPA bus provide direct status indication for the corresponding ports in the PHY device. DTPA transitions high when a predefined (normally user programmable) minimum number of bytes is available in its transmit FIFO. Once high, the DTPA signal indicates that its corresponding transmit FIFO is not full. When DTPA transitions low, it optionally indicates that its transmit FIFO is full or near full (normally user programmable). |
| DTPA[ ] | PHY to LINK<br>Byte-Level Mode | Direct Transmit Packet Available (DTPA[ ]). (Cont'd)<br>DTPA is required if byte-level transfer mode is supported. DTPA is updated on the rising edge of TFCLK. |
| STPA | PHY to LINK<br>Byte-Level Mode | Selected-PHY Transmit Packet Available (STPA) Signal.<br>STPA transitions high when a predefined (normally user programmable) minimum number of bytes are available in the transmit FIFO specified by the in-band address on TDAT. Once high, STPA indicates the transmit FIFO is not full. When STPA transitions low, it indicates that the transmit FIFO is full or near full (normally user programmable).<br>STPA always provides status indication for the selected port of PHY device in order to avoid FIFO overflows while polling is performed. The port which STPA reports is updated on the following rising edge of TFCLK after the PHY address on TDAT is sampled by the PHY device.<br>STPA is required if byte-level transfer mode is supported. STPA is updated on the rising edge of TFCLK. |
| PTPA | PHY to LINK<br>Packet-Level Mode | Polled-PHY Transmit Packet Available (PTPA) signal.<br>PTPA transitions high when a predefined (normally user programmable) minimum number of bytes are available in the polled transmit FIFO. Once high, PTPA indicates that the transmit FIFO is not full. When PTPA transitions low, it optionally indicates that the transmit FIFO is full or near full (normally user programmable).<br>PTPA allows the polling of the PHY selected by TADR address bus. The port which PTPA reports is updated on the following rising edge of TFCLK after the PHY address on TADR is sampled by the PHY device. PTPA is required if packet-level transfer mode is supported. PTPA is updated on the rising edge of TFCLK. |

EXAMPLES

The following examples are not part of the requirements definition of the POS-PHY compatibility specification. They are only informative and provide an aid in the visualization of the interface operation. The examples only present a limited set of scenarios; and are not intended to restrict the scope of the invention.

Figure 6:
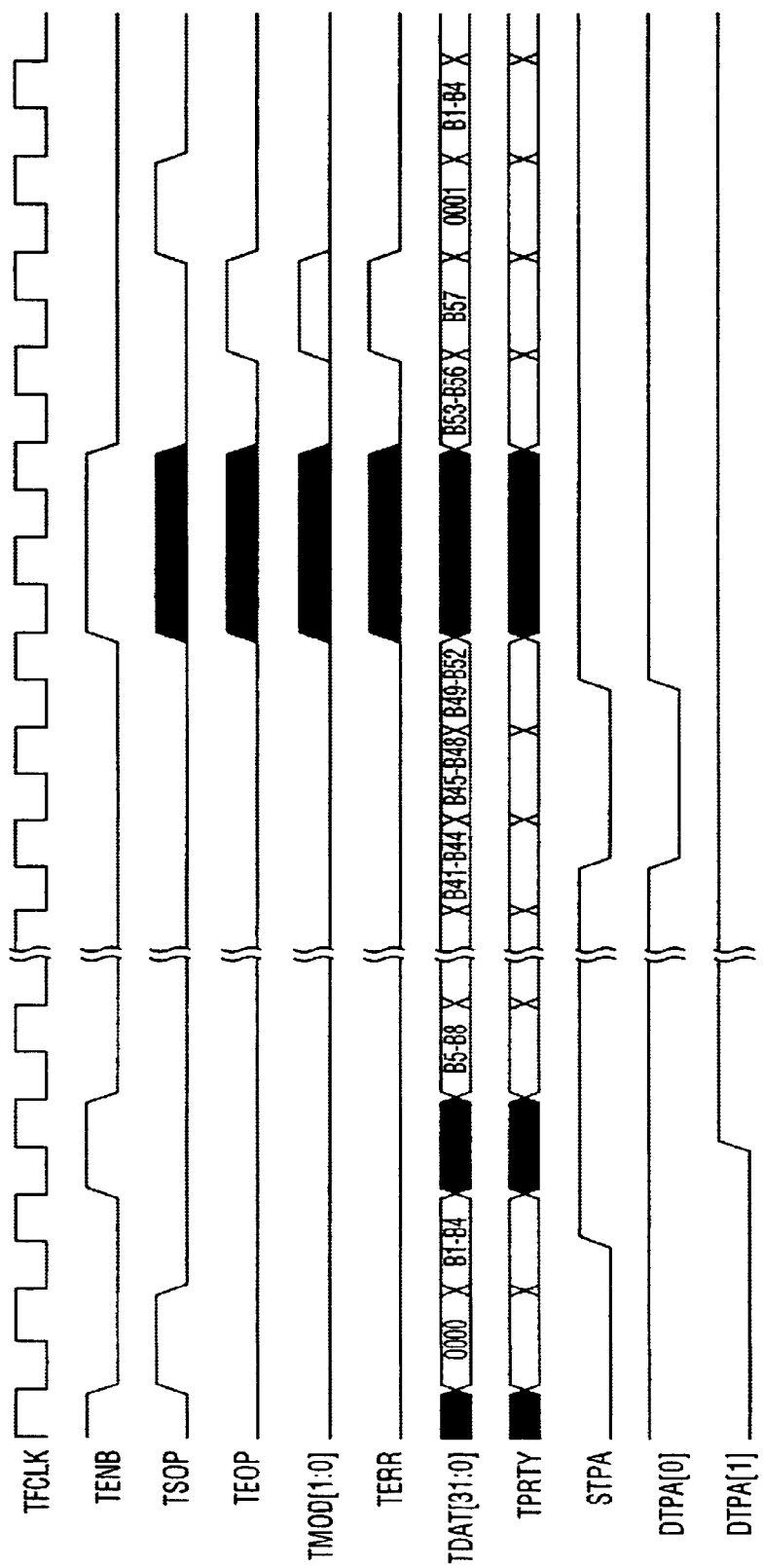
FIG. 6 is a timing diagram showing the transmit logical timing.

The Link Layer device 12 using the TENB signal controls the POS-PHY receive interface. All signals must be updated and sampled using the rising edge of the transmit FIFO clock, TFCLK. FIG. 6 is an example of a multi-port PHY device with two channels. The PHY device 14 indicates that a FIFO 22 is not full by asserting the appropriate transmit packet available signal DTPA. DTPA remains asserted until the transmit FIFO 22 is almost full. Almost full implies that the PHY device 14 can accept at most a predefined number of writes after the current write.

If DTPA is asserted and the Link Layer device 12 is ready to write a word, the Link Layer device 12 should assert TENB low and, if required, present the port address on the TDAT bus with TSOP asserted to select the appropriate transmit FIFO. Subsequent data transfers with TSOP deasserted are treated as packet data, which is written to the selected FIFO. At any time, if the Link Layer device 12 does not have a word to write, it can deassert TENB.

When DTPA transitions low and it has been sampled, the Link Layer device 12 can write no more than a predefined number of bytes to the selected FIFO. In this example, the predefined value is two double-words or eight bytes. If the Link Layer device 12 writes more than that predefined number of words and DTPA remains deasserted throughout, the PHY device 14 should indicate an error condition and ignore additional writes until it asserts DTPA again.

Figure 7:
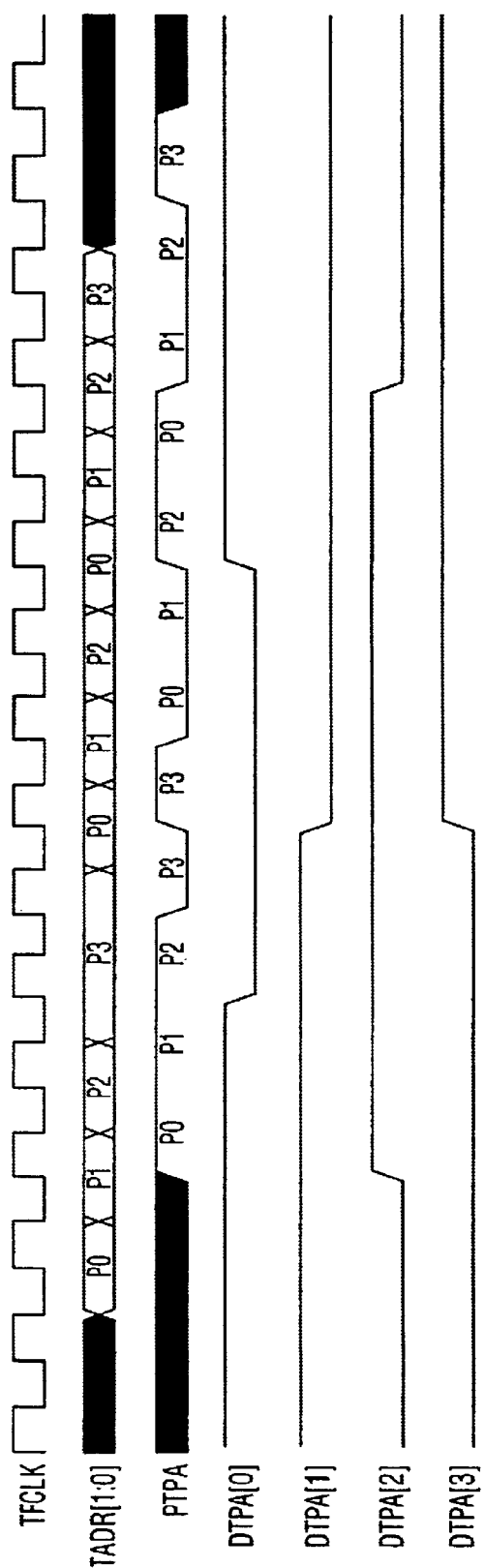
FIG. 7 is a timing diagram of the packet-level transmit polling logical timing.

FIG. 7 is an example of the Link Layer device 12 using the polling feature of the transmit interface. For comparison purposes, the direct transmit packet available signals for the example ports are provided in the diagram. The status of a given PHY port may be determined by setting the polling address TADR bus to the port address. The polled transmit packet available signal PTPA is updated with the transmit FIFO status in a pipelined manner. The Link Layer device 12 is not restricted in its polling order. The selected transmit packet available STPA signal allows monitoring of the status of the selected PHY device and halting data transfer once the FIFO is full. The PTPA signal allows polling other PHY devices at any time, including while a data transfer is in progress. The system could be configured differently.

AC Timing

Figure 8:
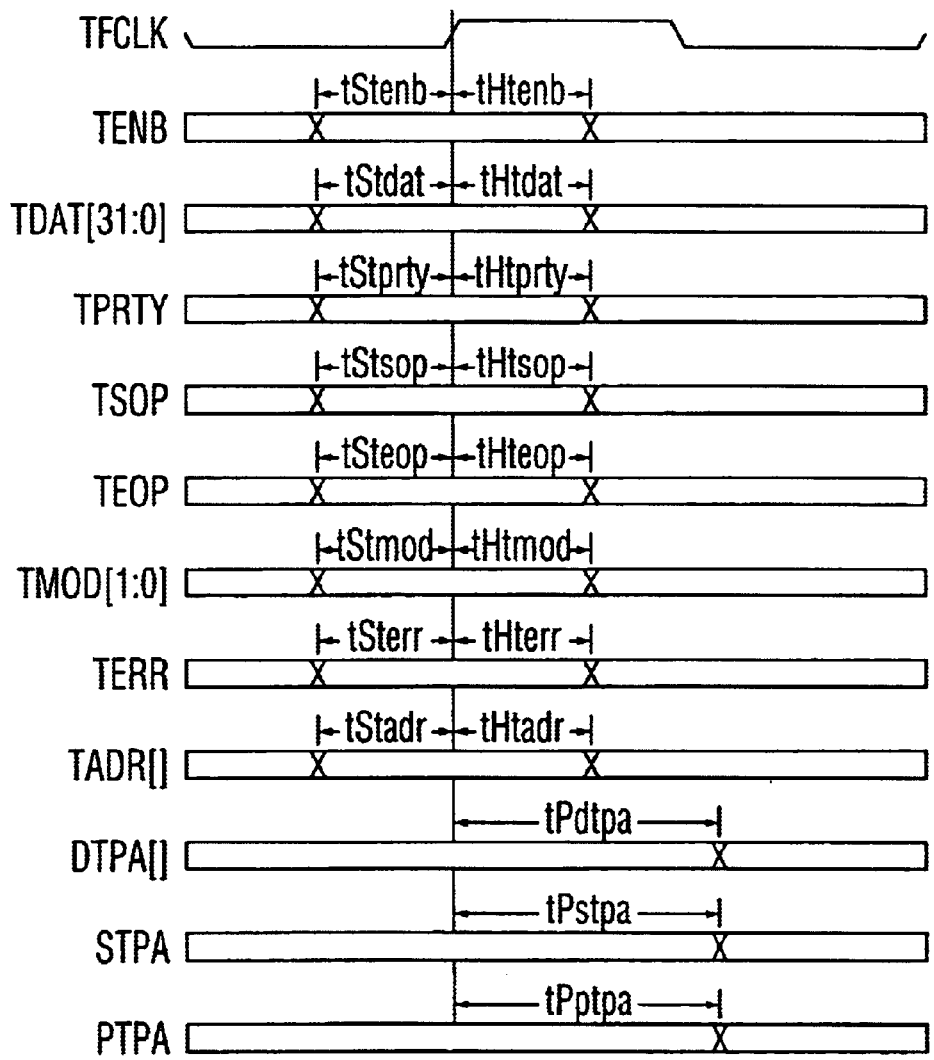
FIG. 8 is a timing diagram of the transmit physical timing.

All AC Timing is from the perspective of the PHY device in a PHY-LINK interface, the symbols and descriptions of which are shown in Table 3. Timing diagrams showing set up times and hold times for transmit physical timing are shown in FIG. 8

TABLE 3

Transmit Interface Timing

| Symbol | Description |
|---|---|
|  | TFCLK frequency |
|  | TFCLK duty cycle |
| $tS_{tenb}$ | TENB Set-up time to TFCLK |
| $tH_{tenb}$ | TENB Hold time to TFCLK |
| $tS_{tdat}$ | TDAT[15:0] Set-up time to TFCLK |
| $tH_{tdat}$ | TDAT[15:0] Hold time to TFCLK |
| $tS_{tprty}$ | TPRTY Set-up time to TFCLK |
| $tH_{tprty}$ | TPRTY Hold time to TFCLK |
| $tS_{tsop}$ | TSOP Set-up time to TFCLK |
| $tH_{tsop}$ | TSOP Hold time to TFCLK |
| $tS_{teop}$ | TEOP Set-up time to tFCLK |
| $tH_{teop}$ | TEOP Hold time to TFCLK |
| $tS_{tmod}$ | TMOD Set-up time to TFCLK |
| $tH_{tmod}$ | TMOD Hold time to TFCLK |
| $tS_{terr}$ | TERR Set-up time to TFCLK |
| $tH_{terr}$ | TERR Hold time to TFCLK |
| $tS_{tadr}$ | TADR[4:0] Set-up time to TFCLK |
| $tH_{tadr}$ | TADR[4:0] Hold time to TFCLK |
| $tP_{dtpa}$ | TFCLK high to DTPA Valid |
| $tP_{stpa}$ | TFCLK High to STPA Valid |
| $tP_{ptpa}$ | TFCLK High to PTPA valid |

Receive Packet Interface Description

The standard FIFO depth for POS-PHY interfaces is 256 octets (but may be larger or smaller). As the interface is point-to-point, the PHY device 14 is required to push receive packet data to the Link Layer device 12. This arrangement simplifies the interface between the PHY device 14 and the Link Layer device 12. Traditional polling schemes for the receive side are not required, saving a significant number of pins.

The receive FIFO 24 shall have a programmable threshold defined in terms of the number of bytes of packet data stored in the FIFO 24. A multi-port PHY device. 14 must service each receive FIFO 24 with sufficient packet data to exceed the threshold or with an end of packet. The PHY device 14 should service the required FIFOs 24 in a round-robin fashion. The type of round-robin algorithm will depend on the various data rates supported by the PHY device 14 and is outside this specification.

The amount of packet data transferred, when servicing the receive FIFO 24, is undefined. One solution is for the PHY device 14 to limit a transfer over the POS-PHY to a maximum fixed amount of packet data per servicing. Another solution would allow the PHY device 14 to empty the FIFO 24 completely before proceeding to the next receive FIFO. In both solutions, the PHY device 14 must end the transfer and proceed to the next FIFO when an end of packet is transferred on the interface.

Receive Signals

Table 4 lists the receive side POS-PHY specification signals. All signals are expected to be updated and sampled using the rising edge of the receive FIFO clock, RFCLK. A fully POS-PHY compatible PHY device requires at least a 256-byte receive FIFO.

TABLE 4

Receive Signal Descriptions

| Signal Name | Direction | Function |
|---|---|---|
| RFCLK | LINK to PHY | Receive FIFO Write Clock (RFCLK). RFCLK is used to synchronize data transfer transactions between the Link Layer device and the PHY device. RFCLK may cycle at a rate up to 100 MHz. |
| RVAL | PHY to LINK | Receive Data Valid (RVAL) signal. RVAL indicates the validity of the receive data signals. RVAL will transition low when a receive FIFO is empty or at the end of a packet. When RVAL is high the RDAT[31:0], RPRTY, RMOD[1:0], RSOP, REOP and RERR signals are valid. When RVAL is low, the RDAT[31:0], RPRTY, RMOD[1:0], RSOP, REOP and RERR signals are invalid and must be disregarded. |
| RENB | LINK to PHY | Receive Read Enable (RENB) signal. The RENB signal is used to control the flow of data from the receive FIFO's. During data transfer, RVAL must be monitored as it will indicate if the RDAT[31:0], RPRTY, RMOD[1:0], RSOP, REOP, RERR and RSOP are valid. The system may deassert RENB at anytime if it is unable to accept data from the PHY device. When RENB is sampled low by the PHY device, a read is performed from the receive FIFO and the RDAT[31:0], RPRTY, RMOD[1:0], RSOP, REOP, and RERR signals are updated on the following rising edge of RFCLK. When RENB is sampled low by the PHY device, a read is not performed and the RDAT[31:0], RPRTY, RMOD[1:0], RSOP, REOP, and RERR signals will not be updated on the following rising edge of RFCLK. |
| RDAT [31:0] | PHY to LINK | Receive Packet Data Bus (RDAT[31:0]). The RDAT[15:0] bus carries the packet octets that are read from the receive FIFO and the in-band port address of the selected receive FIFO. RDAT[31:0] is considered valid only when RVAL is asserted. When a 32-bit interface is used, data must be received in big endian order on RDAT[31:0]. Given the defined data structure, bit 31 is received first and bit 0 is received last. When an 8-bit interface is used, the PHY supports only RDAT[7:0]. |
| RPRTY | PHY to LINK | Receive Parity (RPRTY) signal. The receive parity (RPRTY) signal indicates the parity calculated over the RDAT bus. When an 8-bit interface is used, the PHY only supports RPRTY calculated over RDAT[7:0]. When RPRTY is supported, the PHY device must support both odd and even parity. |
| RMOD [1:0] | PHY to LINK | RMOD[1:0] = "01"  RDAT[31:8] valid<br>RMOD[1:0] = "10"  RDAT[31:16] valid<br>RMOD[1:0] = "11"  RDAT[31:24] valid<br>When an 8-bit interface is used, the RMOD bus is not required. RMOD[1:0] is considered valid only when RVAL is asserted. |
| RSOP | PHY to LINK | Receive Start of Packet (RSOP) signal. RSOP indicates when the in-band port address is present on the RDAT bus. When RSOP is high, the value of RDAT is the address of the receive FIFO selected by the PHY device. Subsequent data transfers on the RDAT bus will be from the FIFO specified by this in-band address. RSOP is considered valid only when RVAL is asserted. |
| REOP | PHY to LINK | Receive End of Packet (REOP) signal. REOP is used to delineate the packet boundaries on the RDAT bus. When REOP is high, the end of the packet is present on the RDAT bus. When a 32-bit interface is used, RMOD[1:0] indicates the number of valid bytes the last double-word is composed of when REOP is asserted. |

TABLE 4-continued

Receive Signal Descriptions

| Signal Name | Direction | Function |
|---|---|---|
| | | When an 8-bit interface is used, the last byte of the packet is on RDAT[7:0] when REOP is asserted. REOP is required to be present at the end of every packet and is considered valid only when RVAL is asserted. |
| RERR | PHY to LINK | Receive error indicator (RERR) signal. RERR is used to indicate that the current packet is aborted and should be discarded. RERR shall only be asserted when REOP is asserted. Conditions that can cause RERR to be set may be but are not limited to, FIFO overflow, abort sequence detection and FCS error. RERR is considered valid only when RVA: is asserted. |

EXAMPLES

The following examples are not part of the requirement definition of the POS-PHY compatibility specification. They are only informative and provide an aid in the visualization of the interface operation. The examples only present a limited set of possible scenarios.

The Link Layer device 12 using the RENB signal controls the POS-PHY receive interface. All signals must be updated and sampled using the rising edge of the receive FIFO clock, RFCLK. The RDAT bus, RPRTY, RMOD, RSOP, REOP and RERR signals are valid in cycles for which RVAL is high and RENB was low in the previous cycle. When transferring data, RVAL is asserted and remains high until the internal FIFO of the PHY device is empty or an end of packet is transferred. The RSOP signal is valid in the cycle for which RVAL is low and RENB was low in the previous cycle.

Figure 9:
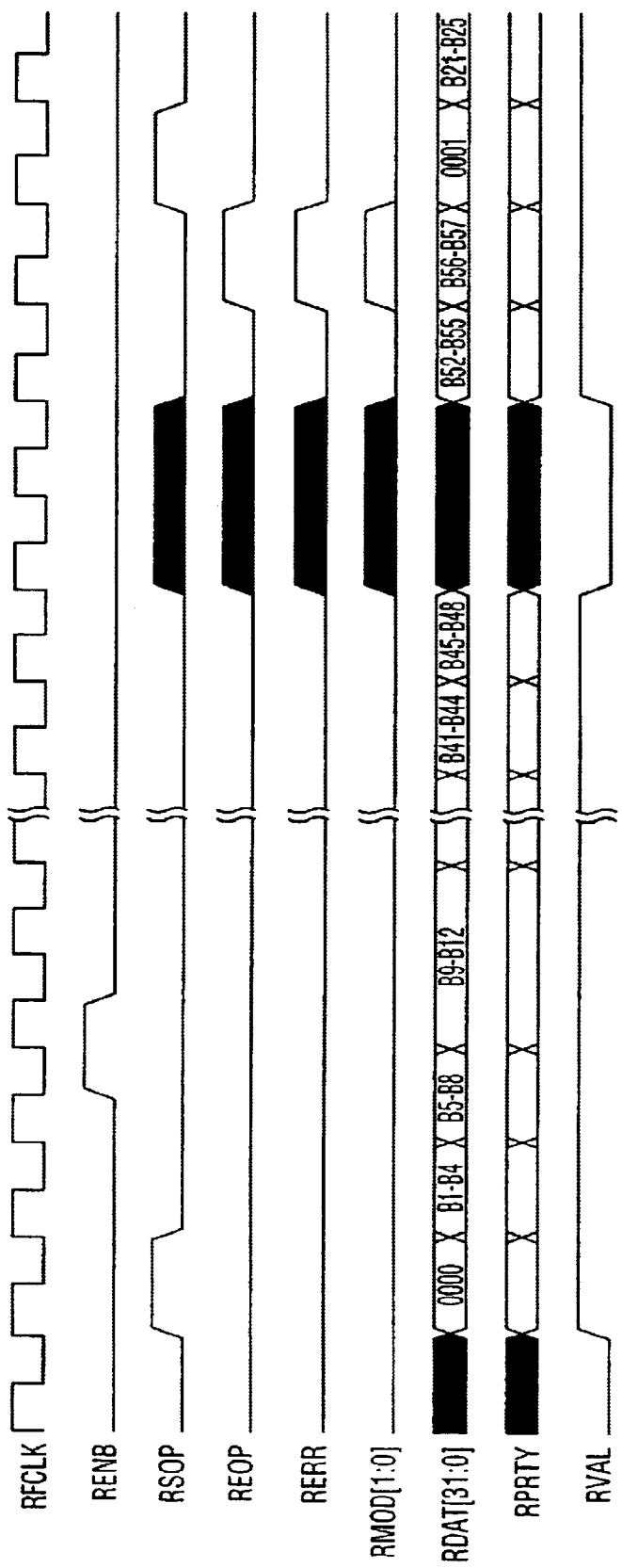
FIG. 9 is a timing diagram of the receive logical timing for a single PHY device.

FIG. 9 is an example of a multi-port PHY device 14 with at least two channels. The PHY device 14 informs the Link Layer device 12 of the port address of the selected FIFO 24 by asserting RSOP with the port address on the RDAT bus. The Link Layer device 12 may pause the receive interface 20 at any time by deasserting the RENB signal. When the selected FIFO 24 is empty, RVAL is deasserted. In this example, the RVAL is reasserted, without changing the selected FIFO 24, transferring the last section of the packet. The end of the packet is indicated with the REOP signal. Thus, the next subsequent FIFO transfer for this port would be the start of the next packet. If an error occurred during the reception of the packet, the RERR would be asserted with REOP. Since another port's FIFO has sufficient data to initial a bus transfer, RSOP is again asserted with the port address. In this case, an intermediate section of the packet is being transferred.

AC Timing

Figure 10:
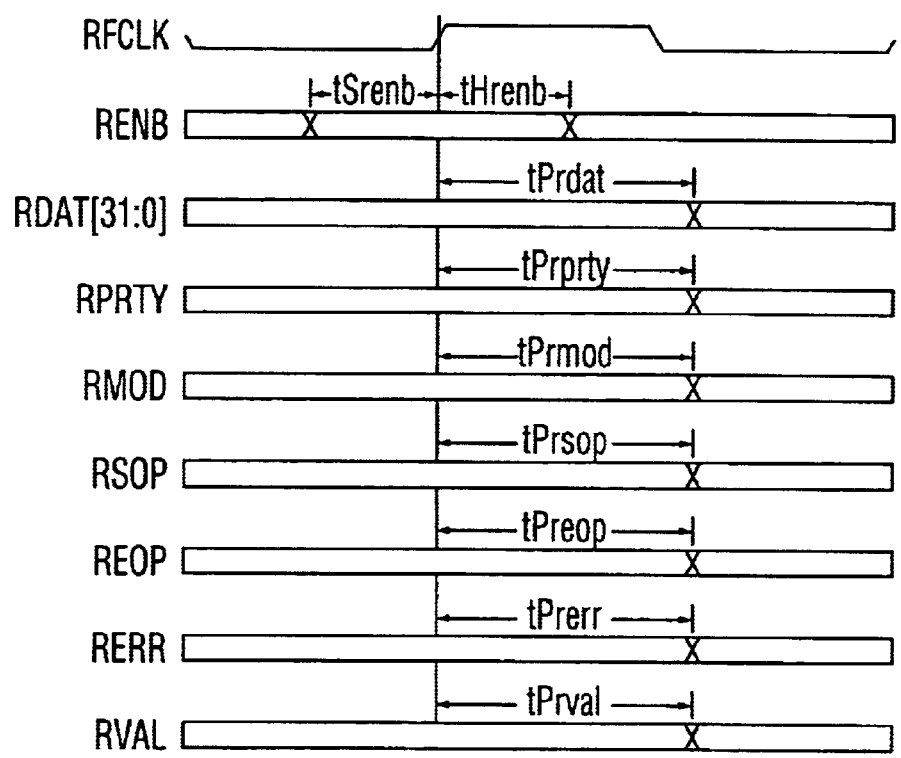
FIG. 10 is a timing diagram of the receive physical timing.

All AC Timing is from the perspective of the PHY device in a PHY-LINK interface, the symbols and associated descriptions for which are shown in Table 5 and in FIG. 10.

TABLE 5

Receive Interface Timing

| Symbol | Description |
|---|---|
| | RFCLK Frequency |
| | RFCLK Duty Cycle |
| $tS_{renb}$ | RENB set-up time to RFCLK |
| $tH_{renb}$ | RENB hold time to RFCLK |
| $tP_{rdat}$ | RFCLK High to RDAT Valid |
| $tP_{rprty}$ | RFCLK High to RPRTY Valid |
| $tP_{rsop}$ | RFCLK High to RSOP Valid |
| $tP_{reop}$ | RFCLK High to REOP Valid |
| $tP_{rmod}$ | RFCLK High to RMOD Valid |
| $tP_{rerr}$ | RFCLK High to RERR Valid |
| $tP_{rval}$ | RFCLK High to RVAL Valid |

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A POS-PHY interface for interfacing between SONET/SDH Physical Layer devices and Link Layer devices, comprising:
   a 32 bit and an 8 bit point-to-point bus interface having a double-word data format operative to accommodate variable sized packets of packet data, and
   said POS-PHY interface using receive side control, whereby a receive side of a Physical Layer device controls which channel is being serviced,
   wherein a transmit interface of one of said Physical Layer devices is selected using an in-band address provided on a same bus which transfers the packet data.

2. A POS-PHY interface according to claim 1, including a start of cell signal generator operative to generate start of cell. signals RSOC/TSOC. to identify when an in-band port address of one of said Physical Layer devices is on a bus of said interface.

3. A POS-PHY interface according to claim 1, including a packet boundary signal generator operative to generate signals REOP/TEOP which delineate the start and end of packets being transferred over the interface.

4. A POS-PHY interface according to claim 1, including a last double-word valid byte indicator operative to indicate if the last double-word of a packet transfer contains 1, 2, 3, or 4 valid bytes of data.

5. A POS-PHY interface according to claim 1, including an error signal generator operative to generate REFF/TERR signals at an end of a packet to indicate whether or not a transferred packet should be discarded/aborted.

6. A POS-PHY interface according to claim 1, wherein at least one of said Physical Layer devices has a plurality of ports with a corresponding respective plurality of first-in first-out buffers (FIFOs) and said one Physical Layer device services each port in a round-robin fashion.

7. A POS-PHY interface according to claim 6, wherein, upon transferring packet data from the Link Layer device to one of a plurality of Physical Layer devices, an address of said one Physical Layer device is inserted in-band with the packet data.

8. A POS-PHY interface according to claim 1, wherein transmit packet available signals are defined based on a byte fill level of first-in first-out buffers of said Physical Layer devices.

9. A POS-PHY interface according to claim 1, wherein the status of packet data reception capacity is provided using one of polling and direct status indication.

10. A POS-PHY interface according to claim 9, wherein polled Physical Layer addresses are provided by a separate address bus and includes pipelined timing.

11. A method for interconnecting a Link Layer packet-processing device with a Physical Layer device, comprising employing data units of non-fixed length and selecting a transmit interface of said Physical Layer device using an in-band address provided on a same bus which transfers said data units, said method using receive side control, whereby a receive side of a Physical Layer device controls which channel is being serviced.

12. A method according to claim 11, including using first-in first-out buffer (FIFO) overflows and under runs.

13. A method according to claim 11, including identifying when an in-band port address of a Physical Layer device is on a data transfer bus.

14. A method according to claim 11, including delineating a start of and end of a variable length data transfer.

15. A method according to claim 11, including determining the order of relevant bytes in an end of a data transfer.

16. A method of interfacing between SONET/SDH Physical Layer devices and Link Layer devices, comprising:
    forming a 32 bit and an 8 bit point-to-point bus interface having a double-word data format operative to accommodate variable sized packets of packet data, and
    using receive side control, whereby a receive side of a Physcial Layer device controls which channel is being serviced,
    wherein a transmit interface of one of said Physical Layer devices is selected using an in-band address provided on a same bus which transfers the packet data.

17. A method according to claim 16, including generating start of cell signals RSOC/TSOC to identify when an in-band port address of one of said Physical Layer devices is on a bus of said interface.

18. A method according to claim 16, including generating signals REOP/TEOP which delineate the start and end of packets being transferred over the interface.

19. A method according to claim 16, including indicating if the last double-word of a packet transfer contains 1, 2, 3, or 4 valid bytes of data.

20. A method according to claim 16, including generating REFF/TERR signals at an end of a packet to indicate whether or not a transferred packet should be discarded/aborted.

21. A method according to claim 16, wherein at least one of said Physical Layer devices has a plurality of ports with a corresponding respective plurality of first-in first-out buffers (FIFOs) and said one Physical Layer device services each port in a round-robin fashion.

22. A method according to claim 16, wherein, upon transferring packet data from the Link Layer device to one of a plurality of Physical Layer devices, an address of said one Physical Layer device is inserted in-band with the packet data.

23. A method according to claim 16, wherein transmit packet available signals are defined based on a byte fill level of first-in first-out buffers of said Physical Layer devices.

24. A method according to claim 16, wherein status of packet data reception capacity is provided using one of polling and direct status indication.

25. A method according to claim 16, wherein polled Physical Layer addresses are provided by a separate address bus and includes pipelined timing.

* * * * *

UNITED STATES PATENT AND TRADEMARK OFFICE
CERTIFICATE OF CORRECTION

PATENT NO. : 6,668,297 B1
DATED : December 23, 2003
INVENTOR(S) : Karr et al.

It is certified that error appears in the above-identified patent and that said Letters Patent is hereby corrected as shown below:

Title page,
Item [75], Inventors, change "Steadman" to -- Steedman --.

Column 9,
Line 49, delete ":" after "Level".

Column 11,
Line 48, delete "." after "device".

Column 14,
Line 40, delete "." after "cell", and delete "." after "TOSC".

Signed and Sealed this

Seventeenth Day of August, 2004

JON W. DUDAS
*Acting Director of the United States Patent and Trademark Office*